3,404,996
**METHOD OF TREATING POLYMERIC SUB-
STRATES SO AS TO IMPROVE ADHESION
OF MAR-RESISTANT SURFACES THERETO**
William George Deichert, Flushing, N.Y., and Wallace
Burton Ramsey, Stamford, Conn., assignors to American Cyanamid Company, Stamford, Conn., a corporation of Maine
No Drawing. Filed May 27, 1965, Ser. No. 459,467
12 Claims. (Cl. 117—47)

ABSTRACT OF THE DISCLOSURE

A method for the production of a plastic body having a mar-resistant surface which comprises contacting a plastic body with sulfuric acid, washing the body and coating the thus treated body such as poly(methyl methacrylate) with a substantially linear, water-insoluble, non-gelled unsaturated polyester resin composition, is disclosed.

---

One of the objects of the present invention is to produce a plastic body having a mar-resistant surface securely bonded to a plastic substrate or base member. A further object of the present invention is to secure a mar-resistant surface to a plastic substrate or base by treating the plastic base with sulfuric acid, washing the base and coating the base with a polyester resin composition, wherein the base before treatment is significantly less mar-resistant than after treatment. These and other objects of the present invention will be discussed in greater detail hereinbelow.

Many plastic bodies, particularly those prepared from thermoplastic materials, have a tendency to be receptive to abrasion and, as a consequence, have a low resistance to marring. Illustrative of these plastic bodies are objects made from poly(methyl methacrylate), polystyrene, polycarbonates, polyvinyl chloride, polyvinyl acetate and the like. In order to retain the otherwise outstanding physical and chemical characteristics of these objects, it is generally necessary to protect one or more of the surfaces thereof with a coating of a resinous material which is capable of being cross-linked to a thermoset condition and which displays, in said thermoset condition, a hard, durable, mar-resistant surface.

In the application of coating compositions such as those recited more specifically hereinbelow, it has been found that the bonding of the mar-resistant coating to the plastic base can be significantly enhanced by treating the surface of said plastic base, to which the mar-resistant finish is to be applied, with sulfuric acid.

We have found that by contacting the surface of the polymer base with sulfuric acid, in pure form or at least in a 70%, preferably at least a 90%, aqueous solution, for from about 15 seconds to 30 minutes, preferably 5 seconds to 10 minutes, and then washing the treated surface so as to obtain a constant pH on the surface, we can prepare the polymer base for contact with the mar-resistant layer. The sulfuric acid treatment causes the polymer base to frost, however, application of the mar-resistant layer causes the base to revert to its original form.

Utilizing this procedure, we have found that the mar-resistant coating is more securely bonded to the polymer base than if the sulfuric acid treatment is omitted, or prior art techniques are used.

The treated surface may be washed with any material which will leave the surface at a constant pH. We have found that water is excellent for this purpose due both to its neutral pH and availability. To determine whether the pH of the polymer base surface is constant, the surface can be heated in water at 50° C. and then tested. It is critical that all the acid be removed because the final article will turn brown in the area where any acid is allowed to remain after the mar-resistant coating is applied.

Any known polyester resin may be used as the surface coating in our novel process, i.e. those produced by reacting a polycarboxylic acid with a polyhydric alcohol under known conditions.

A preferred coating used as the mar-resistant surface on the plastic bodies in the practice of the process of the present invention, is broadly a substantially linear, water-insoluble, non-gelled unsaturated polyester resin composition comprising a blend of (1) the esterification reaction product of reactants consisting essentially of fumaric acid and a polyethylene glycol wherein said glycol has between 6 and 26 carbon atoms, and said product has an acid number below about 30 and (2) a glycol diacrylate which is the reaction product of a glycol selected from the group consisting of polyglycols having from 4 to 8 carbon atoms and monoglycols containing from 2 to 4 carbon atoms, inclusive, and an acid selected from the group consisting of acrylic acid and methacrylic acid, wherein (2) is present in an amount varying between about 10% and 40%, by weight, based on the total weight of (1) and (2).

In order to eliminate any tendency for said coating to develop a haze, especially over a wide temperature range, the aforementioned linear polyester resin composition may be further modified by adding thereto comparatively small amounts, such as between about 1% and 5%, by weight, of a polymerizable styrene, wherein said percentages by weight are based on the total weight of the glycol fumarate, the glycol diacrylate and the styrene monomer.

More specifically, the surfacing material used to impart the mar-resistant characteristic to the plastic base in the process of the present invention is more completely set forth in copending application Ser. No. 307,812, filed Sept. 10, 1963, in the names of Deichert and Webb. In the aforesaid application, now Patent No. 3,264,372, there is set forth a disclosure of substantially linear, water-insoluble, non-gelled unsaturated polyester resin composition which is used as the surfacing component in the present invention. These earlier polyester resin compositions impart to the substrates to which they are applied markedly improved mar-resistant properties in those instances when the substrate has a deficiency in mar-resistance. When the plastic substrate is coated with the polyester resin composition used in the present invention without pre-treatment with the sulfuric acid, the bonding of the polyester resin film to the substrate is less secure and has a poorer degree of bond, as measured by the Scotch tape grid test, than a comparable plastic base which has been treated with sulfuric acid according to the instant process.

The substantially linear, water-insoluble, non-gelled, unsaturated polyester resin composition used to impart the mar-resistant surface in the present invention comprises a blend of two principal components, namely certain fumaric acid glycol polyester resins and certain glycol diacrylates. If desired, comparatively small amounts, such as about 1–5%, of a polymerizable styrene can be used with the two principal components to diminish tendencies for haze development. A more specific disclosure of such compositions is set forth in copending application, Ser. No. 390,197, filed Aug. 17, 1964, in the names of Deichert and Christensen, now Patent No. 3,265,763. Insignificant amounts of other additives which have no serious detrimental effect on the properties of the ultimate product produced are also within the scope of the mar-resistant coatings which may be used in the process of the present invention.

In these compositions, the first component used therein is the esterification reaction product produced by reacting components consisting essentially of fumaric acid and a polyethylene glycol wherein said glycol contains between 6 and 26 carbon atoms. The esterification reaction between the fumaric acid and the polyethylene glycol is carried out until an acid number below about 30 is reached.

Among the polyethylene glycols which may be used to esterify the fumaric acid are triethylene glycol, tetraethylene glycol, pentaethylene glycol, hexaethylene glycol, heptaethylene glycol, octaethylene glycol, dodecaethylene glycol and tridecaethylene glycol. These polyethylene glycols may be used either singly or in combination with one another. In the practice of the process of the present invention relating to the preparation of this polyester resin composition, the fumaric acid and the polyethylene glycol will be used in substantially equimolar proportions, since each is, for the purposes of esterification, difunctional. For preferred processing results, a slight excess amounting to about 5 to 20% of the polyethylene glycol should be used over and beyond the amount stoichiometrically calculated to esterify substantially all of the carboxyl groups in the fumaric acid.

The second component used in the above-mentioned surfacing compositions, namely the glycol diacrylates, are prepared by esterifying an alpha, beta, ethylenically unsaturated monocarboxylic acid selected from the group consisting of acrylic acid and methacrylic acid with a glycol selected from the group consisting of polyglycols having from 4 to 8 carbon atoms and monoglycols containing from 2 to 4 carbon atoms. Among the polyglycols which may be used to produce the glycol diacrylates are diethylene glycol, triethylene glycol, tetraethylene glycol, dipropylene glycol having a molecular weight of about 200 and the like. Among the monoglycols which may be used to esterify the acrylic acids are ethylene glycol, propyleneglycol and the propanediols-1,2 and 1,3 and the butanediols-1,2; 1,3; and 1,4. These glycol diacrylates can be used with the glycol fumarates either singly or in combination with one another. However, whether used singly or in combination, the glycol diacrylate should be present in the total composition in an amount varying between about 10% and 40% by weight based on the total weight of said glycol fumarate and said glycol diacrylate.

An additional mar-resistant coating which may be utilized in our novel process include those composed of (1) the esterification reaction product of triethylene glycol and fumaric acid, (2) ethyl acrylate, (3) allyl methacrylate and (4) triallyl cyanurate. This composition is the subject of copending application Ser. No. 454,714, filed May 10, 1965, now Patent No. 3,294,867 and contains between 60%, by weight, solids, and 90%, by weight, based on the total polyester composition (1), and from about 40%, by weight, to about 10%, by weight, of the other different copolymerizable monomers (2), (3) and (4). Trace amounts, i.e. up to 5%, of other acids such as phthalic acid, adipic acid, succinic acid, etc. and/or other alcohols such as 2-ethyl-1,3-hexanediol, neopentyl glycol, etc. may also be tolerated.

A further example of a suitable mar-resistant coating useful herein is set forth in copending application Ser. No. 459,464, filed May 27, 1965, now Patent No. 3,318,975. This coating composition is composed of (A) the esterification reaction product of triethylene glycol and fumaric acid, (B) allyl methacrylate and (C) certain glycol diacrylates, i.e. those disclosed more fully hereinabove. The same trace amounts of acids and alcohols as specified immediately above may also be tolerated in this composition.

In a further modification, a suitable mar-resistant coating which may be used herein is composed of (a) the esterification reaction product of fumaric acid, triethylene glycol and 2-ethyl-1,3-hexanediol, (b) a polymerizable styrene and (c) certain glycol diacrylates. Component (c) is more fully discussed hereinabove in regard to other useful mar-resistant coatings. Examples of polymerizable styrenes include styrene per se, side chain and ring-substituted halo and/or alkyl styrenes such as α-chlorostyrene, α-methylstyrene, o-, m-, and p-methyl styrenes, o-, m-, and p-chlorostyrenes, 2,4-dimethylstyrene, 2,5-dimethylstyrene, 2,3-dichlorostyrene, 2,4-dibromostyrene and the like. The use of such styrenes is to be avoided, however, when a clear, water-white composition is desired. Trace amounts of other acids and alcohols are not tolerable in this composition which is more fully set forth in copending application Ser. No. 398,053, filed Sept. 21, 1964, by Deichert, Christensen and Ramsey, now Patent No. 3,265,764, which application and all those mentioned hereinabove are hereby incorporated herein by reference.

The substantially linear, water-insoluble, non-gelled unsaturated polyester resin compositions useful in the present invention may be converted to hard mar-resistant products. This conversion from the ungelled or thermosetting state to the hard, thermoset state can be accomplished by the application of heat and/or pressure with or without catalysis. Still further, the thermosetting material can be converted to the thermoset state by use of catalysts or initiators without resorting to either heat or pressure. The catalytic materials or polymerization initiators which would be used to make such a conversion in state are well-known in the art and have been used extensively for this purpose. Illustrative catalysts are the peroxide catalysts such as, benzoyl peroxide, tertiary butyl hydroperoxide, ditertiary butyl peroxide, and cumene hydroperoxide, among many others. The ketone peroxides may also be used such as, the methyl ethyl ketone peroxide, the diethyl ketone peroxide and the like. The amounts of the catalytic material used will be conventional such as between about 0.01% and 10% and more usually between about 0.1% and 3%, by weight, based on the total weight of the polymerizable composition.

The coated plastic articles produced according to the process of the present invention have a plurality of designed end uses such as transparent panels to be used as windowpanes, television implosion shields, optical lenses such as those used in eyeglasses, including sunglasses, binoculars, telescopes and the like. If desired, the polyester resin compositions may have incorporated therein, ultraviolet light absorbers of which a substantial plurality are well known in the art. A significant number of these ultraviolet absorbers are disclosed in the Day et al. U.S. Patent 2,777,828. The amounts used are now conventional and are set forth in the aforementioned reference. If desired, particularly for show-window purposes and sunglasses, photochromic materials may be incorporated into the polymerizable resin of the present invention thereby permitting changes from a colored glass to a clear glass and vice versa, due to the absence or presence of light, including sunlight. If a permanent coloration is desired in the polymerizable polyester resins of the present invention, that will not defeat the principle desired end use, namely, transparency, certain dyes and/or pigments may be dissolved in the unsaturated polymerizable polyester resin in order to achieve a tinting.

The following examples are set forth for purposes of illustration only and are not to be construed as limitations on the present invention except as set forth in the appended claims. All parts and percentages are by weight unless otherwise indicated.

Example 1

A cast sheet of poly(methyl methacrylate) is contacted with a 95% aqueous solution of sulfuric acid for 30 seconds. The resultant sheet is then washed with water until the pH of the surface of the sheet is neutral. (Neutrality determined by heating in water at 50° C. and testing for acid.) Thereafter, a polyester composition comprising 80 parts of triethylene glycol fumarate and 20 parts of polyethylene glycol dimethacrylate, catalyzed with a mixture of one part of a 60% solution of methylethyl ketone peroxide in dimethyl phthalate, one part of benzoyl peroxide, .0005 part of cobalt as cobalt naphthanate and 0.003 part of calcium as calcium naphthanate, is poured onto the acid treated poly(methyl methacrylate) sheet. The resulting coated sheet is placed between two layers of plate glass and clamped together to form a unitary structure. The entire assembly is held at 70° C.

for 16 hours then 90 minutes at 100° C. On cooling, the glass plates are removed and the surface of the resultant sheet is tested for mar-resistance and bond strength. The mar-resistance is extremely high and the bond is excellent as measured by the Scotch tape grid test. Haze is 0.9%. The mar-resistance of an uncoated sheet of polymethylmethacrylate using the same mar-tester is 30. All the polyester mar-resistant coating is removed by the Scotch tape grid test when a coating is applied to a poly(methyl methacrylate) sheet which was not pretreated with sulfuric acid.

The Scotch tape grid test is accomplished by scratching the finished surface through, with a sharp point in a series of parallel lines about 1/16" apart and then with a similar series at right angles to the first series and also spaced 1/16" apart. A piece of No. 600 cellophane tape is firmly pressed into contact with the coated surface so as to cover the scratched lines. When the tape is pulled off quickly, no peeling of the coated surface will be observed if the bonding is excellent. Slight removal of the finish at the edges of the scratches is permissible without effecting the bonding reading.

Example 2

Example 1 is repeated in substantially all details except that the polyester resin composition contains, additionally, about 3 parts of monomeric styrene. The mar-resistance of the ultimate coated article is extremely high and the bond test is excellent as measured by the Scotch tape grid test.

The mar-resistance is 1 as measured by a mar tester. None of the coating is removed by the Scotch tape grid test. The haze value on the finished product is 0.2%. When a sheet of poly(methyl methacrylate), coated with the same polyester resin but not treated with sulfuric acid, is tested with the Scotch tape grid test, all the polyester coating is removed.

Following the procedure of Example 1, various other polyester compositions, base polymers, and acids were utilized according to the instant invention. The results are set forth in Table 1, hereinbelow.

for from about 5 seconds to about 30 minutes, (2) washing the acid-contacted surface to remove substantially all of said sulfuric acid therefrom and produce a surface having a constant pH and (3) coating the thus treated sheet with a substantially linear, water-insoluble, non-gelled, unsaturated polyester resin composition.

3. A process according to claim 2 wherein said sulfuric acid is at a concentration of at least 90%.

4. A process for improving the mar-resistance of a poly(methyl methacrylate) sheet and also improving the bonding of the surface layer to said sheet comprising (1) contacting said sheet with a material consisting essentially of at least a 70% aqueous solution of sulfuric acid for from about 5 seconds to about 30 minutes, (2) washing the acid-contacted surface to remove substantially all of said sulfuric acid therefrom and produce a surface having a constant pH and (3) coating the thus treated sheet with a substantially linear, water-insoluble, non-gelled, unsaturated polyester resin composition comprising a blend of (A) the esterification reaction product of fumaric acid and a polyethylene glycol wherein said glycol has between 6 and 26 carbon atoms, said reaction product having an acid number below about 30 and (B) at least one copolymerizable monomer.

5. A process according to claim 4 wherein said copolymerizable monomer is a glycol diacrylate which is the reaction product of a glycol selected from the group consisting of polyglycols having from 4 to 8 carbon atoms, inclusive, and monoglycols having from 2 to 4 carbon atoms, inclusive and an acid selected from the group consisting of acrylic acid and methacrylic acid wherein (B) is present in an amount ranging from about 10% and 40%, by weight, based on the total weight of (A) and (B).

6. A process according to claim 4 wherein (B) is a mixture of ethyl acrylate, allyl methacrylate and triallyl cyanurate.

7. A process according to claim 4 wherein said sulfuric acid is at a concentration of at least 90%.

8. A process for improving the mar-resistance of a

TABLE I

| Ex. | Polyester composition, parts | Base polymer | Acid | Mar resistance | Grid test |
|---|---|---|---|---|---|
| 3 | Same as Example 1 | Same as Example 1 | 85% H₃PO₄ | 1 | All coating removed—failed. |
| 5 | do | do | do ¹ | 1 | Do. |
| 4 | do | do | Oxalic acid | 1 | Do. |
| 6 | do | do | 70% HNO₃ | 1 | Do. |
| 7 | do | do | HCl | 1 | Do. |
| 8 | Triethylene glycol fumarate, 80; diethyleneglycol diacrylate, 20; styrene, 10. | Poly(vinyl chloride) | 95% H₂SO₄ | 1 | Passed—no coating removed. |
| 9 | Triethylene glycol fumarate, 296; ethyl acrylate, 60; allyl methacrylate, 24; triallyl cyanurate, 20. | Poly(methyl methacrylate) | 75% H₂SO₄ | 2 | Do. |
| 10 | Triethylene glycol/2-ethyl-1,3-hexanediol/fumaric acid (1/1/2), 100; diethylene glycol diacrylate, 25; styrene, 5. | Poly(styrene) | do | 3 | Do. |
| 11 | Triethylene glycol fumarate, 80; triethylene glycol dimethacrylate, 10; allyl methacrylate, 10. | Poly(methyl methacrylate) | Fuming H₂SO₄ | 2 | Do. |

¹ Soaked at 75° C. for 1 hour.

We claim:

1. A process for improving the mar-resistance of a poly(methyl methacrylate) sheet and also improving the bonding of a surface layer to said sheet comprising (1) contacting said sheet with a material consisting essentially of at least a 70% aqueous solution of sulfuric acid, for from about 5 seconds to about 30 minutes, (2) washing the acid-contacted surface to remove substantially all of said sulfuric acid therefrom and produce a surface having a constant pH and (3) coating the thus treated sheet with a polyester resin composition.

2. A process for improving the mar-resistance of a poly(methyl methacrylate) sheet and also improving the bonding of the surface layer to said sheet comprising (1) contacting said sheet with a material consisting essentially of at least a 70% aqueous solution of sulfuric acid poly(methyl methacrylate) sheet and also improving the bonding of the surface layer to said sheet comprising (1) contacting said sheet with a material consisting essentially of at least a 70% aqueous solution of sulfuric acid for from about 5 seconds to 30 minutes, (2) washing the acid-treated surface with water to remove substantially all of said sulfuric acid therefrom and produce a surface having a constant pH and (3) coating the thus treated sheet with a substantially linear, water-insoluble, non-gelled, unsaturated polyester resin composition comprising a blend of (A) the esterification reaction product of fumaric acid and a polyethylene glycol, wherein said glycol has between 6 and 26 carbon atoms and wherein said product has an acid number below about 30, (B) a glycol diacrylate which is the reaction product of a glycol selected from the group consisting of polyglycols having from 4 to 8 carbon atoms and monoglycols containing from 2 to 4 carbon atoms, inclusive, and an acid selected from the group consisting of acrylic acid and methacrylic acid wherein (B) is present in an amount varying between about 10% and 40%, by weight, based on the total weight of (A) and (B), and (C) a polymerizable styrene in an amount varying between about 1% and 5%, by weight, based on the total weight of (A), (B) and (C).

9. A process according to claim 8 wherein (A) is the esterification reaction product of fumaric acid, triethylene glycol and 2-ethyl-1,3-hexanediol.

10. A process for improving the mar-resistance of a poly(methyl methacrylate) sheet and also improving the bonding of the surface layer to said sheet comprising (1) contacting said sheet with a material consisting essentially of at least a 70% aqueous solution of sulfuric acid for from about 5 seconds to 30 minutes, (2) washing the acid-treated sheet with water to remove substantially all of said sulfuric acid therefrom and produce a surface having a constant pH and (3) coating the thus treated sheet with a substantially linear, water-insoluble, non-gelled, unsaturated polyester resin composition comprising a blend of (A) the esterification reaction product of fumaric acid and triethylene glycol, said product having an acid number below about 30 and (B) ethylene glycol dimethacrylate wherein (B) is present in an amount varying between about 10% and 40%, by weight, based on the total weight of (A) and (B).

11. A process for improving the mar-resistance of a poly(methyl methacrylate) sheet and also improving the bonding of the surface layer to said sheet comprising (1) contacting said sheet with a material consisting essentially of at least a 70% aqueous solution of sulfuric acid for from 5 seconds to 30 minutes, (2) washing the acid-treated sheet with water to remove substantially all of said sulfuric acid therefrom and produce a surface having a constant pH and (3) coating the thus treated sheet with a substantially linear, water-insoluble, non-saturated polyester resin composition comprising a blend of (A) the esterification reaction product of fumaric acid and triethylene glycol and (B) triethyleneglycol dimethacrylate.

12. A process for improving the mar-resistance of a poly(methyl methacrylate) sheet and also improving the bonding of the surface layer to said sheet comprising (1) contacting said sheet with a material consisting essentially of at least a 70% aqueous solution of sulfuric acid for from about 5 seconds to 30 minutes, (2) washing the acid-treated surface with water to remove substantially all of said sulfuric acid therefrom and produce a surface having a constant pH and (3) coating the thus treated sheet with a substantially linear, water-insoluble, non-gelled, unsaturated polyester resin composition comprising a blend of (A) the esterification reaction product of fumaric acid and a polyethylene glycol, wherein said glycol has between 6 and 26 carbon atoms and wherein said product has an acid number below about 30, (B) a glycol diacrylate which is the reaction product of a glycol selected from the group consisting of polyglycols having from 4 to 8 carbon atoms and monoglycols containing from 2 to 4 carbon atoms, inclusive, and an acid selected from the group consisting of acrylic acid and methacrylic acid, wherein (B) is present in an amount varying between about 10% and 40%, by weight, based on the total weight of (A) and (B), and (C) allyl methacrylate.

References Cited
UNITED STATES PATENTS

| | | |
|---|---|---|
| 3,142,581 | 7/1964 | Leland. |
| 3,264,372 | 8/1966 | Deichert et al. |
| 3,265,763 | 8/1966 | Deichert et al. |
| 3,265,764 | 8/1966 | Deichert et al. |
| 3,294,867 | 12/1966 | Bristol et al. |

WILLIAM D. MARTIN, *Primary Examiner.*

T. G. DAVIS, *Assistant Examiner.*